(12) United States Patent
Grigorenko

(10) Patent No.: US 10,086,462 B2
(45) Date of Patent: Oct. 2, 2018

(54) HARDFACING WITH LOW CARBON STEEL ELECTRODE

(71) Applicant: Caterpillar Inc., Peoria, IL (US)

(72) Inventor: Dale C. Grigorenko, Corinth, MS (US)

(73) Assignee: Caterpillar Inc., Deerfield, IL (US)

( * ) Notice: Subject to any disclaimer, the term of this patent is extended or adjusted under 35 U.S.C. 154(b) by 25 days.

(21) Appl. No.: 15/193,717

(22) Filed: Jun. 27, 2016

(65) Prior Publication Data

US 2017/0368629 A1 Dec. 28, 2017

(51) Int. Cl.

| | |
|---|---|
| B23K 9/12 | (2006.01) |
| B23K 9/04 | (2006.01) |
| B23K 9/09 | (2006.01) |
| B23K 9/095 | (2006.01) |
| B23K 9/173 | (2006.01) |
| B23K 35/30 | (2006.01) |
| C22C 38/04 | (2006.01) |
| C22C 38/02 | (2006.01) |

(52) U.S. Cl.
CPC ............... B23K 9/04 (2013.01); B23K 9/048 (2013.01); B23K 9/091 (2013.01); B23K 9/095 (2013.01); B23K 9/12 (2013.01); B23K 9/124 (2013.01); B23K 9/173 (2013.01); B23K 35/3073 (2013.01); C22C 38/02 (2013.01); C22C 38/04 (2013.01); C22C 2200/00 (2013.01)

(58) Field of Classification Search
CPC .......... B23K 9/02–9/038; B23K 9/04–9/0738; B23K 9/12–9/126

USPC ...... 219/54, 60 R–60 A, 76.1–76.14, 121.11, 219/130.01–137.2

See application file for complete search history.

(56) References Cited

U.S. PATENT DOCUMENTS

| | | | |
|---|---|---|---|
| 2,249,629 A | 7/1941 | Hopkins | |
| 2,806,127 A | 9/1957 | Hackman et al. | |
| 6,093,906 A * | 7/2000 | Nicholson | B23K 9/0282 219/137 PS |
| 9,035,220 B2 | 5/2015 | Schorghuber | |
| 2007/0181549 A1* | 8/2007 | Hartman | B23K 35/0261 219/137 WM |
| 2008/0053978 A1* | 3/2008 | Peters | B23K 9/025 219/130.5 |
| 2009/0045172 A1* | 2/2009 | Van Erk | B23K 35/02 219/61 |

FOREIGN PATENT DOCUMENTS

CN 102126064 1/2013

* cited by examiner

*Primary Examiner* — Michael LaFlame, Jr.
(74) *Attorney, Agent, or Firm* — Finnegan, Henderson, Farabow, Garrett & Dunner, LLP (57) ABSTRACT

A method of hardfacing a metal component includes welding a surface area of the metal component using a Cold Metal Transfer (CMT) process. The method of hardfacing the metal component includes performing the CMT welding process in a weaving pattern over the surface area of the component. A consumable, low carbon steel wire electrode is used in the CMT process.

12 Claims, 5 Drawing Sheets

HARDFACING WITH LOW CARBON STEEL ELECTRODE

TECHNICAL FIELD

The present disclosure relates generally to hardfacing of a component, and more particularly, to hardfacing of a component with a low carbon steel electrode.

BACKGROUND

Components such as tools on earth moving equipment, undercarriage components for heavy equipment, pump shafts, engine components, bushings, and other parts with one or more surfaces that undergo contact and relative motion with respect to other surfaces may be subjected to wear and the progressive loss of material. Wear to contacting surfaces may result from abrasion, impact, erosion, galling, cavitation, and other static and/or dynamic conditions, potentially leading to a requirement for repair or replacement of the component more frequently than would otherwise be necessary. Hardfacing is a form of surfacing that may be applied to such wear components for the purpose of reducing the wear and other detrimental surface conditions.

Hardfacing is a metalworking process where harder or tougher material is applied to a base metal. The harder or tougher material may be welded to the base material, and generally takes the form of specialized wire electrodes for arc welding or filler rod for oxyacetylene or tungsten inert gas (TIG) welding. Hardfacing may be applied to a new part during production to increase its wear resistance, or it may be used to restore a worn-down surface. Hardfacing by arc welding is a surfacing operation to extend the service life of industrial components, pre-emptively on new components, or as part of a maintenance program. Hardfacing has resulted in significant savings in machine down time and production costs in many industries.

The American Welding Society defines hardfacing as "[a] surfacing variation in which surfacing material is deposited to reduce wear." The term surfacing is defined as "[t]he application by welding . . . of a layer, or layers, of material to a surface to obtain desired properties or dimensions, as opposed to making a joint." AWS A3.0 Standard Welding Terms and Definitions. Hardfacing involves the deposition of a new material on the base material of the component. In general, the hardfacing material may have a similar or a different composition than the base material. Hardfacing may be performed using a number of welding (or cladding) techniques. These techniques can be broadly classified into three categories as, arc welding (or arc cladding), thermal spraying, and laser-based cladding.

There are a number of different arc welding techniques that are commonly used in the industry to perform hardfacing. These include, for example, gas tungsten arc welding (GTAW), plasma arc welding (PAW), plasma transferred arc (PTA), gas metal arc welding (GMAW), submerged arc welding (SAW) and several others. In these processes, an arc is established to melt the surface of the base material, usually in the presence of a shield gas. The hardfacing material, which is introduced in either wire or powder form, is also melted by the arc to form the hardfaced layer. Arc welding produces a layer that is fully welded and metallurgically bonded to the substrate of the component. This layer may have a higher hardness, and therefore better wear properties, than the component substrate. However, a major disadvantage of arc welding is that the high temperatures involved in depositing the hardfaced layer may act to soften (or reduce the hardness of) a layer of material on the surface of the component beneath the hardfaced layer. This zone of heat-softened material on the component surface is referred to as the heat affected zone (HAZ). Therefore, although arc welding deposits a layer of material having high wear resistance on the component surface, the wear resistance of the underlying component surface deteriorates as a result of the heat-intensive welding process. Since the hardfaced layer will eventually wear off after extended operation, reduced wear resistance of the underlying component surface detrimentally affects the useable life of the component by hastening component wear after the hardfaced layer has worn off. Also, in some circumstances, a relatively soft under-layer can also cause the hardfaced layer to be crushed or it can crack as the under-layer gives way. The damaged hardface layer will then spall off the component surface. In addition, during the hardfacing process, the substrate will act like a heat sink and will quench the hardface layer on the surface. When components hardfaced using these traditional techniques are subjected to higher impact abrasive environments, the brittle, hardfaced layer often chips and spalls.

U.S. Pat. No. 2,249,629 issued to Hopkins (the '629 patent) discloses an armored article in which an armor metal is produced by fusing together a hard metal with a base metal using electric energy discharge. After the fusing operation, the armored article is subject to heat treatment to develop the desired hardness in the hard metal and the base metal. The '629 patent disclosed steel chemistry ranges for the base material and heat treatment parameters that would yield base material hardness of 200 to 400 Brinell (approximately Rkw C 18 to 43). While the process of the '629 patent includes heat treatment after a welding operation, this process may have deficiencies. For instance, the heat affected zone (HAZ) created by the welding process may not be restored by the process of the '629 patent. Moreover, the conventional hardfacing electrodes are often very expensive, and have very poor weldability/stability, producing large amounts of spatter and often weld cracking.

The disclosed hardfacing process and products are directed at overcoming these and/or other shortcomings in existing technology.

SUMMARY

In one aspect, the present disclosure is directed to a method of hardfacing a metal component. The method may include welding a surface area of the metal component using a Cold Metal Transfer (CMT) process. The method may further include performing the welding in a weaving pattern over the surface area of the component, and using a consumable, low carbon steel wire electrode in the CMT process.

In another aspect, the present disclosure is directed to a method of hardfacing a metal component. The method may include welding a surface area of the metal component using a Cold Metal Transfer (CMT) process. The CMT process may include providing electrical power from a power source to a consumable, low carbon steel wire electrode, wherein the consumable, low carbon steel wire electrode comprises approximately 0.05-0.20% by weight carbon (C), approximately 1.30-2.0% by weight manganese (Mn), and approximately 0.70-1.20% by weight silicon (Si). The electrical power may be provided in a succession of pulses of electrical power with at least one of varying current and varying voltage. The method may also include reciprocating the consumable, low carbon steel wire electrode toward and away from the metal component, controlling the electrical power being provided to the electrode while the electrode is being reciprocated such that at least one of a welding current and a welding voltage supplied to the electrode is pulsed from a higher value during an electric-arc phase to a lower value during a short-circuit phase, and sensing a short-circuit condition when a molten droplet of weld filler metal on a distal end of the electrode makes contact with a molten weld pool being formed on a surface of the metal component. The method may still further include moving the electrode away from the metal component and reducing the electrical power provided to the electrode each time the short-circuit condition is sensed, and repeating the reciprocating of the electrode and the pulsing of electrical power provided to the electrode in order to deposit a succession of small droplets of molten weld filler metal from the low carbon steel wire electrode onto the surface of the metal component.

In yet another aspect, the present disclosure is directed to a metal component including a surface area that has been hardfaced. The metal component may be produced by a process that includes welding the surface area of the component using a Short-Circuit Gas Metal Arc Welding (GMAW-S) process. The GMAW-S process comprises providing electrical power from a power source to a consumable, low carbon steel wire electrode, wherein the consumable, low carbon steel wire electrode comprises approximately 0.05-0.20% by weight carbon (C), approximately 1.30-2.0% by weight manganese (Mn), and approximately 0.70-1.20% by weight silicon (Si), with the electrical power being provided in a succession of pulses of electrical power with at least one of varying current and varying voltage. The GMAW-S process may further include reciprocating the consumable wire electrode toward and away from the metal component, controlling the electrical power being provided to the electrode while the electrode is being reciprocated such that at least one of a welding current and a welding voltage supplied to the electrode is pulsed between a higher value and a lower value, and sensing a short-circuit condition when a molten droplet of weld filler metal on a distal end of the electrode makes contact with a molten weld pool being formed on a surface of the metal component. The process by which the component is produced may still further include moving the electrode away from the metal component and reducing the electrical power provided to the electrode each time the short-circuit condition is sensed, and repeating the reciprocating of the electrode and the pulsing of electrical power provided to the electrode in order to deposit a succession of small droplets of molten weld filler metal from the low carbon steel wire electrode onto the surface of the metal component.

DETAILED DESCRIPTION

Figure 1:
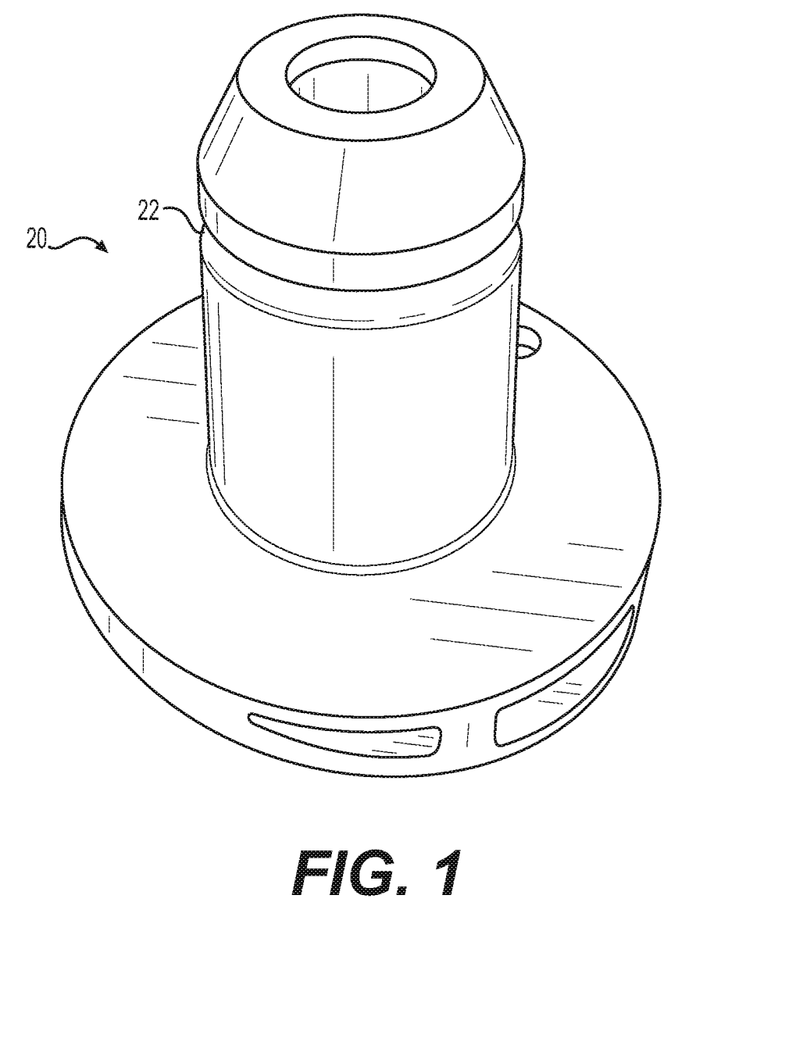
FIG. 1 is an illustration of an exemplary component to be hardfaced in accordance with the disclosed methods.

Referring to FIG. 1, an exemplary metal component manufactured from a material such as ductile cast iron is illustrated. In this example the component is a fuel pump shaft 20. The low heat input hardfacing methods disclosed herein may be used with other products that may include configurations with one or more outer peripheral portions, inner peripheral portions, and end portions, and that may include one or more surface areas or regions on any of these portions subjected to wear and loss of material. The disclosed implementations may be used for hardfacing surface areas or regions on other metallic components, and in particular, other cast metallic components such as components made from grey cast iron and ductile cast iron. Various grades of cast iron are used in a multitude of industrial machinery, including as shafts and other rotating parts in pumps and other devices of all sizes and configurations. Metallic seals may be used in contact with portions of the rotating parts, and may cause wear and loss of material over extended periods of time. The cast iron material provides structural rigidity and high strength, particularly in compression. Cast iron also has a good strength to weight ratio, high machinability, good corrosion resistance, good damping characteristics, and excellent castability into the many different shapes and sizes needed in various industrial applications. Grey cast iron, grade 30, for example, has a yield strength of 30,000 psi. Where greater strength is needed for more demanding applications, the chemistry and iron making processes may be adjusted to obtain ductile cast iron with yield strength that may be twice as strong as grey cast iron. In ductile cast iron the carbon takes the form of graphite in the shape of spheroids rather than as individual flakes as in gray cast iron. Ductile cast iron, sometimes referred to as nodular cast iron, may be made by inoculating the molten metal, just before casting, with a small amount of magnesium or cerium. This inoculation is what causes the free carbon in the finished casting to appear as rounded nodules of graphite rather than as flakes. The spheres of graphite don't act as stress raisers but as crack arresters, and are what give the ductile cast iron its ductility and higher yield strength. Almost every cast iron contains well over 2.0% carbon, with some containing as much as 4.0% carbon. Unlike in steel, most of the carbon in cast iron is present in uncombined form, as graphite. In steel, the carbon is combined with iron in the form of iron carbides, such as grains of pearlite, grains of cementite, or scattered small particles of carbide. Grey cast iron may also contain some combined carbon (iron carbide) as grains of pearlite, grains of cementite or martensite.

Because of their high carbon content, two conditions may result from traditional fusion welding and weld hardfacing of cast irons: (a) the formation of massive carbides in regions of the parent metal that are melted or partially melted during the weld pass, and (b) the formation of martensite in regions of the parent metal that are heated to a temperature above the eutectoid but below the eutectic. The eutectoid reaction is characterized by a phase transformation of one solid into two different solids. In iron-carbon (Fe—C) systems, such as in cast iron, there is a eutectoid point at approximately 723 degrees C. If the welding process heats up the base material in a fusion zone around where the weld material is being applied to temperatures above this eutectoid point, the crystal structure of the cast iron may be transformed from ferrite to austenite. Subsequent cooling may result in a transformation of the austenite into cementite (iron carbide), cementite and ferrite (pearlite), and/or martensite at rapid cooling rates. The result is a fusion zone that is harder and potentially more brittle than surrounding zones. Both carbide and martensite formation result in weld zones having properties different from those of the base metal. Thus, the weld zone may have a hardness that is significantly higher than the surrounding metal.

Two approaches to the fusion welding of cast irons have been used to achieve sound welds. In the first approach, nodular graphite is produced in the weld which resembles the graphite contained in the base metal. This is accomplished by adding graphitizing agents, such as silicon, and nodularizing agents, such as magnesium or rare earth metals, to the weld metal from the welding rod or flux. In this way, a weld metal is produced which has a microstructure, mechanical properties, and thermal expansion properties similar to those of the base metal. In the second approach, nickel or copper is added as filler materials to the weld pool to produce an austenitic weld metal. The austenitic weld metal is tough, relatively soft, and exhibits other favorable properties. Satisfactory welds are produced by this approach because the eutectoid transformation to martensite is avoided and because of the ability of austenite to absorb carbon rejected by the melted cast iron, thus reducing the formation of carbides.

Nickel works successfully in the second approach discussed above because it is an austenite phase stabilizer. When present in austenite, it shifts the eutectoid point so as to suppress the transformation of austenite into pearlite. Nickel is therefore classified as an austenite former. At present, nickel is typically introduced into the weld pool as an ingredient of the welding rods. Nickel-base covered electrodes are available for the arc welding of cast irons. These electrodes are classified as "pure" nickel, containing 90 to 95% Ni, nickel-iron, containing about 55% Ni, and nickel-copper, containing about 60% Ni. The "pure" nickel and nickel-iron electrodes have emerged as the most satisfactory thus far for welding cast iron. The use of nickel as filler material for welding cast iron presents several problems. First, nickel is expensive. Second, the thermal properties of nickel are significantly different from those of cast iron and give rise to thermal expansion mismatch between base metal and weld metal. This can result in stresses high enough to cause cracking. Third, phosphorus has low solubility in nickel. This too can result in cracking when nickel-base electrodes are used to weld irons high in phosphorus.

Another problem that may be encountered when welding cast irons is caused by the relatively low ductility of cast iron, and in particular grey cast iron. If grey cast iron is loaded beyond its yield point, it breaks rather than deforming to any significant extent. Therefore, the weld filler metal and part configuration generally has to be selected in order to minimize welding stresses. Because grey cast iron contains graphite in flake form, the carbon may be readily introduced into the weld pool during a weld repair process. The dilution of the base material, and particularly carbon, into the weld filler material may cause weld metal embrittlement. Consequently, techniques in accordance with various implementations of the present disclosure, which minimize base metal dilution, reduce the amount of carbon formed, and reduce the Heat Affected Zone (HAZ), are desirable when weld hardfacing cast iron components. As grey cast iron solidifies after welding, solidification tensile stresses may result in cracking in the HAZ unless a weld filler material is used with sufficient ductility to compensate for the lack of ductility of the base material.

In accordance with various implementations of the present disclosure, variations of a Gas Metal Arc Weld (GMAW) process are used in conjunction with a consumable, low carbon steel wire electrode. In some implementations, the low carbon steel wire electrode may be made from a combination of materials with a coefficient of thermal expansion (CTE) that is within ±10% of the CTE of the base cast iron materials being welded for the purpose of hardfacing one or more surface areas or regions. The use of a weld material with a CTE within ±10% of the CTE of the base cast iron material ensures that there are not large differences between the amount of expansion and contraction of the base material and the weld material when the weld hardfaced component is exposed to large fluctuations in temperature. Large differences in the CTE between the weld material and the base metal may contribute to cracking and other defects in the weld zone after the component has undergone these fluctuations in temperature.

The variation to a GMAW process in accordance with various implementations of this disclosure is referred to herein as a Cold Metal Transfer (CMT) process. The CMT process is a modified GMAW process that uses a method of molten metal droplet detachment from the consumable, low carbon steel wire electrode based on short-circuit welding. The CMT process is a variation to the Short-Circuit Gas Metal Arc Welding (GMAW-S) that includes controlling the amount of welding current and/or welding voltage applied to the consumable electrode, and also controlling a reciprocating movement of the electrode toward and away from the component being welded. The CMT process is characterized by very low current flows through the part being hardfaced, and significant reductions in the amount of heat input at the weld zone, which in turn results in a much smaller Heat Affected Zone (HAZ), and less dilution of the base metal into the filler metal. Less heat input during the welding process also means that the component does not have to be preheated to as high a temperature in order to reduce the cooling rate of the HAZ after welding. The formation of many small, individual droplets of molten metal during the CMT process provides an additional benefit in that there is a reduction in overall solification stresses as a result of the many small puddles of molten material solidifying rather than a single larger puddle. In various implementations of this disclosure, a cast iron component may only need to be preheated to a temperature in the range of 300-400 degrees F. A wider range of pre-heating temperatures between approximately 200-800 degrees F. may also be used. These preheat temperatures are low enough to avoid the formation of oxides on the surface of the cast iron component during and after the weld hardfacing process, and therefore reduce the amount of clean up required after welding.

The use of a low carbon steel wire electrode during the CMT hardfacing process according to various implementations of this disclosure allows for the use of a much less expensive weld filler material than would otherwise be required during weld hardfacing of metal components such as those made from ductile cast iron. The nickel-base covered electrodes used for welding cast iron, such as discussed above, may be as much as 45 times more expensive than low carbon steel wire electrodes suitable for the CMT hardfacing processes according to this disclosure.

The CMT process results in lower heat input as a result of cycling the amount of welding current being applied to the consumable electrode as the electrode is moved forward into contact with a molten weld puddle and then retracted. When the power source detects a short-circuit as a result of the molten droplet of weld filler metal on a distal end of the electrode contacting the molten weld puddle, the welding current drops and the electrode begins to retract. Retraction of the electrode helps to detach the droplet of molten weld metal from the electrode into the molten weld puddle on the metal component. In some implementations, after detection of a short-circuit, the weld current may also be provided with a spike in amplitude before dropping in order to further assist the separation of the droplet from the electrode. The electrode may be constantly retracted and extended at very short intervals of time, and the reciprocating motion of the electrode may be performed at a rate of 50-150 cycles per second. The precisely defined retraction of the electrode facilitates controlled droplet detachment to give a clean, virtually spatter-free material transfer from the consumable electrode to the cast iron component. The cycling of the welding current also results in significantly less total heat input during the welding process. During the CMT hardfacing processes according to various implementations of this disclosure, the retraction and extension of the electrode during the CMT process may be performed simultaneously with moving the electrode in a weaving pattern over the area or region being hardfaced. In one exemplary implementation of a hardfacing process, each pass of the low carbon steel electrode during movement of at least one of the electrode and the component being hardfaced relative to each other in a weaving pattern across the area to be hardfaced may cover an area up to approximately 10 mm wide, with the electrode being moved back and forth across the area at a rate of approximately 1-2 times per second. The width of each pass, and the rate of back and forth motion of the electrode relative to the component during the weaving motion may vary from the above-mentioned values depending on the material of the component being hardfaced as well as other welding parameters.

Figure 2:
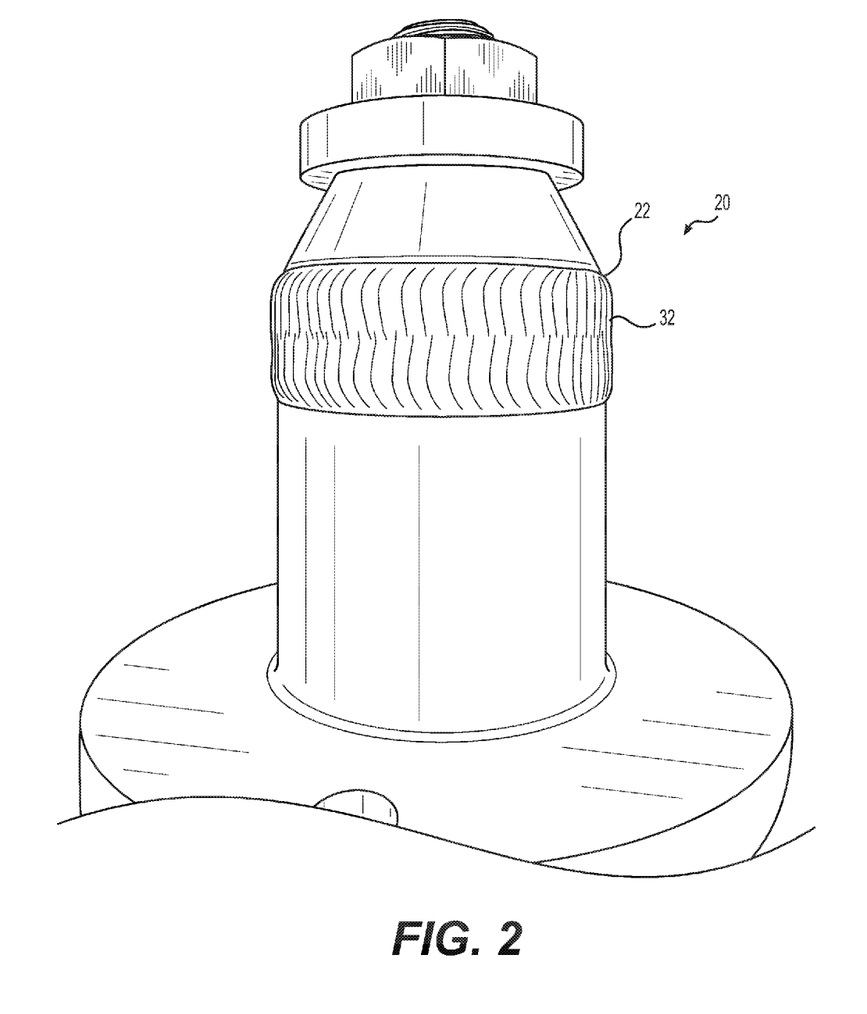
FIG. 2 is another illustration of the exemplary component of FIG. 1 after welding hardfacing material onto an area of the component.
Figure 3:
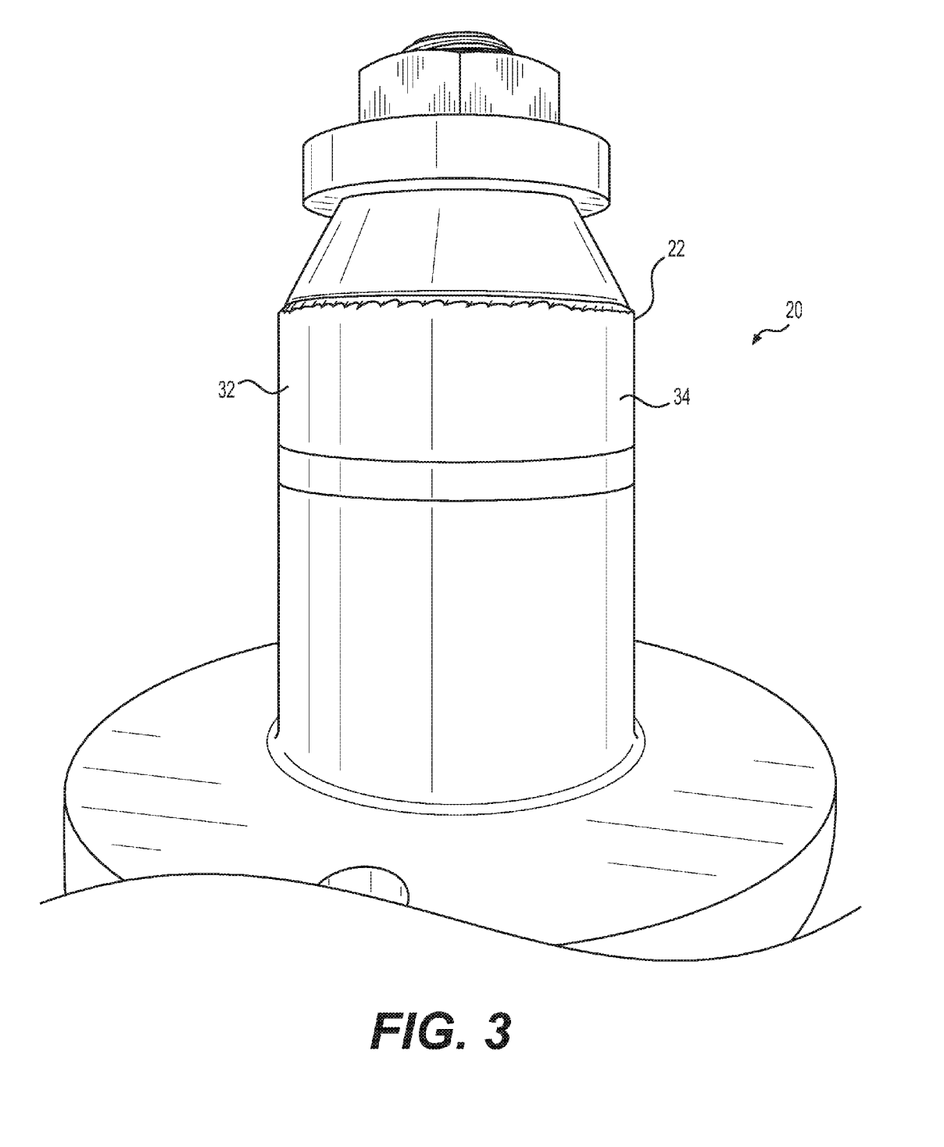
FIG. 3 is yet another illustration of the exemplary component of FIG. 1 after machining of the welded, hardfaced area.
Figure 4:
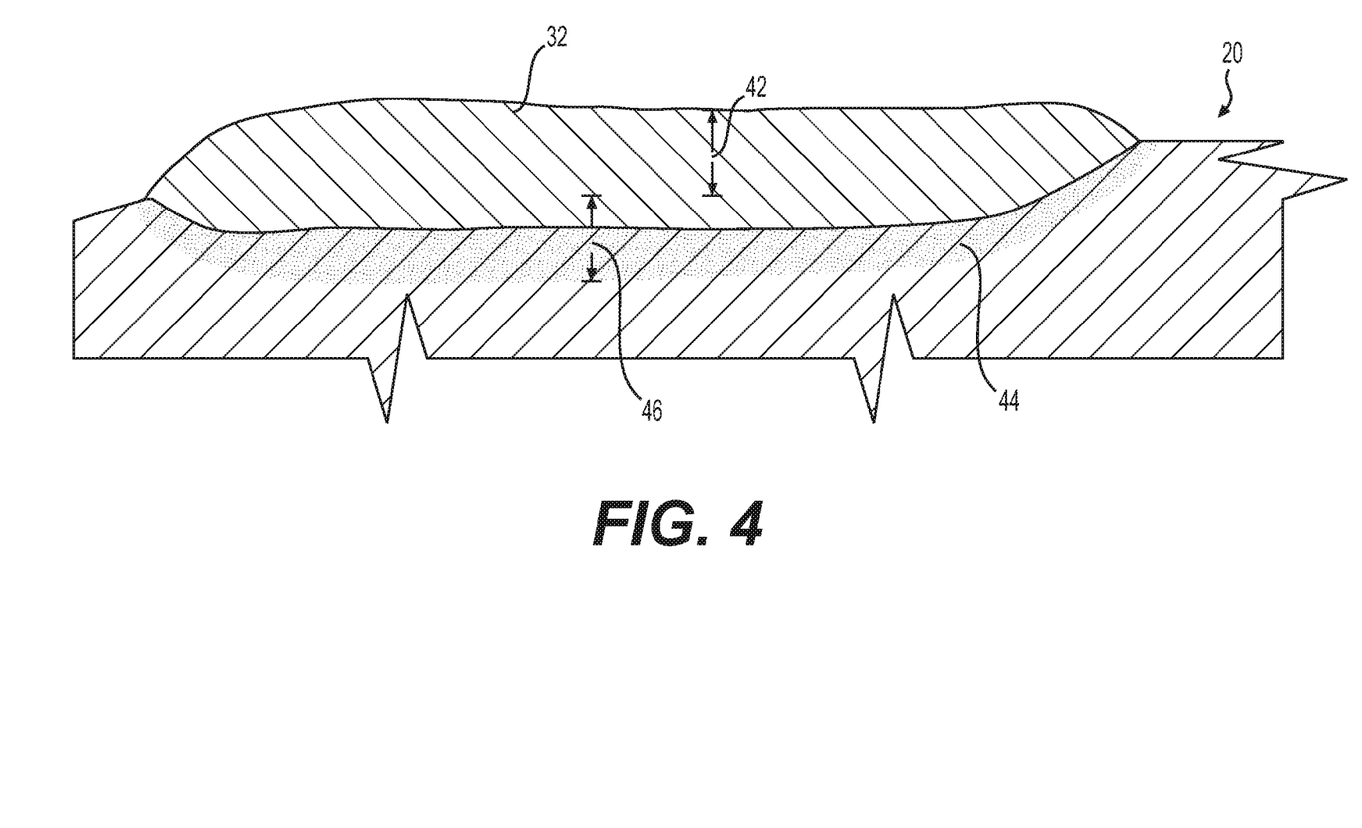
FIG. 4 is an axial cross-section through the welded, hardfaced area shown in FIG. 2.

The fuel pump shaft 20 shown in FIG. 1 may undergo a low heat input CMT hardfacing process in accordance with various implementations of this disclosure in order to provide a hardened surface against which a metal seal may interface. The seal interface region may first be machined away to form a circumferential groove 22 around the area of the shaft that will be contacted by a seal. As shown in FIG. 2, the circumferential groove 22 may then be filled with weld material 32 from a consumable, low carbon steel wire electrode using a CMT process. After the CMT welding process, the area with weld buildup may then be machined as shown in FIG. 3 to produce a finished, hardened surface 34 against which a seal may interface with significantly improved wear resistance when compared to the shaft without hardfacing. As further shown in a cross-sectional view of FIG. 4, the thickness 42 of the weld buildup during the CMT hardfacing process may be achieved as such low heat input to the component that the depth 46 of a heat affected zone (HAZ) 44 below the weld buildup may be approximately the same thickness or less than the thickness of the weld buildup. In the exemplary embodiment illustrated in FIG. 4, the weld buildup during the CMT hardfacing process may be greater than or equal to approximately 1-2 mm (dimension 42 in FIG. 4), with a HAZ below the weld buildup that may be approximately 1-2 mm thick (dimension 46 in FIG. 4). In some implementations, the HAZ may be significantly less than the thickness of the weld buildup during the CMT hardfacing process since the process sends very small amounts of current through the component being welded, with resulting small heat input to the surface area being hardfaced. Defects or damage in the area where the hardfacing will be performed may include cracks, fissures, porosity, or other anomalies. The area with a defect may be removed by various processes including machining, grinding, arc gouging, flame gouging, etc. In some alternative implementations of this disclosure, removal of an area with a defect or other anamoly may include preparation of the area using chemicals, shot peening, or other techniques to remove oils or other foreign matter on the surface. The removed area of the component that was discovered to have defects, damage, or other anamolies, may then be built up with weld material from a consumable, low carbon steel electrode, as shown in FIGS. 2 and 4. One of ordinary skill in the art will recognize that welding of the area with removed defects or damage may comprise building up part of the original volume of material that was removed, all of the original volume of removed material, or more than the original volume of removed material.

In some exemplary implementations of the CMT hardfacing process according to this disclosure, the low carbon steel wire electrode may comprise a metal inert gas (MIG) welding wire electrode such as ER70S-6 Carbon Steel, which is a mild steel welding wire with low levels of carbon, and relatively high levels of deoxidizers such as silicon (Si) and maganese (Mn). The composition may comprise approximately 0.06-0.15% carbon (C), 1.40-1.85% manganese (Mn), 0.035 max % sulfur (S), 0.80-1.15% silicon (Si), 0.025 max % phosphorus (P), 0.50 max % copper (Cu), 0.05% chromium (Cr), with trace amounts of nickel (Ni), molybdenum (Mo), and vanadium (V). The relatively high levels of deoxidizers such as the Si and Mn may allow for hardfacing on surfaces that have not been thoroughly cleaned, may provide better wetting, give a flatter bead shape, and allow for faster relative travel speeds between the wire electrode and the component being hardfaced. Shielding gases that may be used during the welding process with the low carbon steel wire electrodes may include 75/25 argon/carbon dioxide shielding gas, or shielding gas with higher argon content, such as 90/10 argon/carbon dioxide. The ER70S-6 welding wire conforms to American Welding Society (AWS) specifications AWS A5.18 ER70S-6. The CMT hardfacing process with low carbon steel wire electrode such as the ER70S-6 may result in hardness levels that are greater than 60 HRC (Rockwell C Hardness). In some implementations on various base metals, the CMT hardfacing process using consumable, low carbon steel wire electrode in accordance with this disclosure may result in hardness levels of anywhere from 35 HRC-67 HRC. Additional implementations of the CMT hardfacing process may use low carbon steel wire electrodes with slightly higher levels of carbon, and other variations in composition, including ER80, ER90, and ER120 versions of MIG welding wire electrodes.

In some implementations, and depending on the particular metal of the component being hardfaced, a furnace may also be used to preheat the component being hardfaced after machining away or otherwise removing defective or damaged portions, or otherwise preparing the area to be hardfaced, such as during the machining of circumferential groove 22 around an outer peripheral surface of the shaft 20 shown in FIG. 1. However, in many applications employing the CMT hardfacing process in accordance with this disclosure, no pre-heat is required because the levels of heat input to the component during the process are so low. A furnace may be an electric furnace, a gas furnace, an infrared furnace, or any of other known types of furnaces capable of preheating the metal component to temperatures in a range from approximately 200 degrees Fahrenheit to 800 degrees Fahrenheit. In alternative implementations, the preheating may also be performed in a more localized fashion using a torch or other manually controlled heating device. After preheating, each component ready for hardfacing may be placed in a smaller, portable weld box that is a furnace with removable, insulated lid sections. The portable weld box may be configured to be rolled into a room where a welder can access various sections of the component through openings in a wall separating the weld box from an air conditioned compartment where the welder is located. The weld box may be configured, for example, to maintain the preheated temperature of the metal component as the component is accessed behind a removable lid section.

Figure 5:
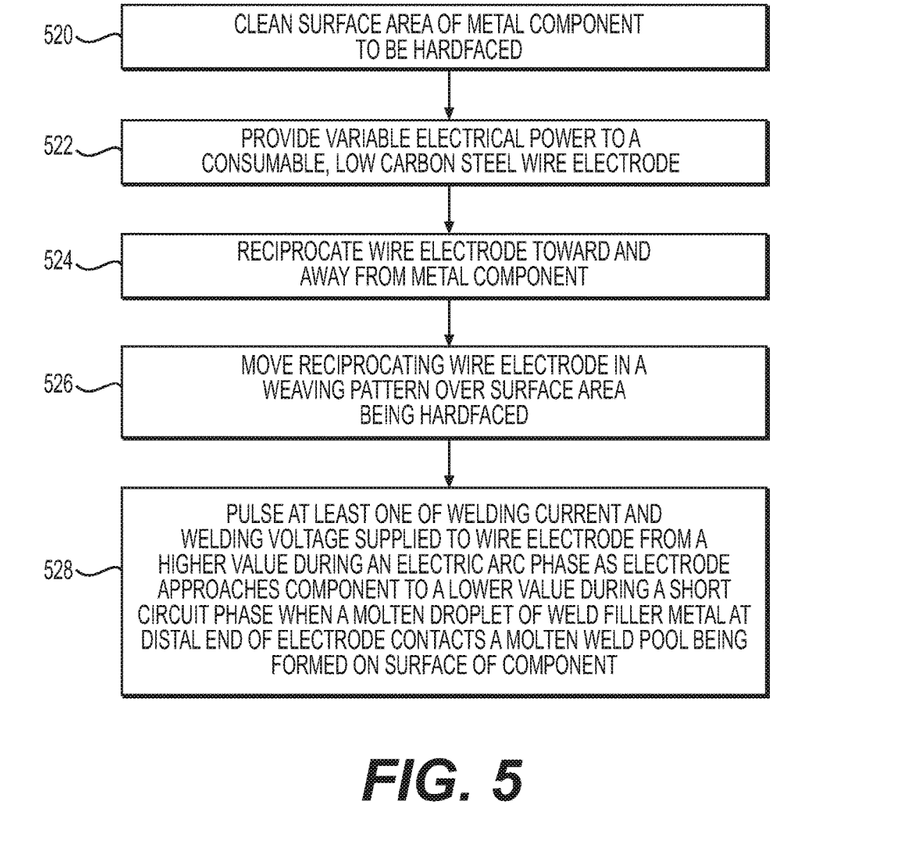
FIG. 5 is a flow chart describing an exemplary disclosed method for low heat input hardfacing of the component shown in FIG. 1.

FIG. 5 illustrates an exemplary disclosed process of low heat input CMT hardfacing of a component using a consumable, low carbon steel wire electrode. FIG. 5 will be discussed in more detail in the following section to further illustrate the disclosed concepts.

INDUSTRIAL APPLICABILITY

The disclosed methods of low heat input weld hardfacing of metal components may be applicable to a wide variety of components such as tools on earth moving equipment, undercarriage components for heavy equipment, pump shafts, engine components, bushings, and other parts with one or more surfaces that undergo contact and relative motion with respect to other surfaces may be subjected to wear and the progressive loss of material. The disclosed methods allow for careful control of the temperatures a component reaches during the hardfacing process, as well as significantly reducing the total heat input to the components. The disclosed methods enable weld hardfacing of both grey cast iron and ductile cast iron components without many of the typical problems encountered when welding cast iron. The low heat input compared to heat input generally associated with GMAW and other methods of welding cast iron results in overall distortion of the base metal of the cast iron components that is orders of magnitude less than distortion that would result from traditional welding techniques. The low heat input also results in less of a Heat Affected Zone (HAZ), and less pre-heating required before welding to reduce the cooling rate after welding for avoidance of the formation of brittle, crack-inducing microstructures. Less total heat input during the weld hardfacing process also results in less dilution of the base metal into the weld filler metal, less depth of penetration, and less chance of developing any pockets, bubbles, or brittle, high carbon areas in the weld material that is added to buildup areas that have been machined away. The CMT process also enables the use of more traditional low carbon steel welding wire rather than requiring more expensive welding wire with high levels of nickel or manganese. This advantage stems at least in part from the CMT process producing many small puddles of molten weld material during the weld process rather than one, larger weld puddle. As a result, the overall solidification tensile stresses are reduced as the individual smaller puddles of molten metal don't exert as much solidification tensile stress on surrounding base material as would be the case with larger puddles of molten metal. The reduction in overall solidification tensile stresses means that the filler metal does not have to be as ductile a material as would otherwise be required to compensate for relatively low ductility of the base material, especially when hardfacing cast iron material.

During the CMT process in accordance with various implementations of this disclosure, the consumable, low carbon steel wire electrode is fed forward during an electric-arc phase until the electrode comes into contact with the workpiece. During this electric-arc phase the consumable wire electrode is melted from the heat generated by the welding current flowing through the wire electrode and by the electric-arc between the distal end of the electrode and the workpiece. A droplet of molten weld filler material forms at the end of the wire electrode. During the electric-arc phase the welding current and/or the welding voltage supplied to the wire electrode may be initially controlled such that the droplet of molten metal will not detach from the distal end of the electrode. When the wire electrode with a molten droplet forming at its distal end makes contact with the weld pool formed on the workpiece, a short-circuit occurs between the electrode and the workpiece. During this short-circuit phase, the short-circuit is detected, and the wire-feed direction is reversed so that the wire electrode will be moved backwards away from the workpiece until the short circuit has been opened as a result of detachment of the droplet of molten weld filler metal from the distal end of the electrode. In some implementations of the disclosed process, the weld current may also be temporarily increased for a short period of time in order to further assist with separation of the droplet of molten metal from the distal end of the electrode. The weld current and/or voltage may be reduced after detection of the short-circuit, and for a brief period of time afterwards as the electrode is moved backwards away from the workpiece. Following this reduction in weld current and/or voltage, and after either a defined period of time or a defined distance away from the workpiece, the weld current and/or voltage may be increased again to generate another electric-arc as the electrode is again moved toward the workpiece.

During the CMT welding process, the consumable wire electrode is subjected to a reciprocating movement at a certain movement frequency corresponding to the number of short-circuits per second. The movement frequency may be, e.g., anywhere within a range from approximately 50-150 cycles per second. During each cycle a wire electrode feeding mechanism may be controlled by a first control signal that causes the electrode to be fed backwards in the short-circuit phase. After the droplet of molten metal has detached from the distal end of the electrode, the wire electrode feeding mechanism may stop the backward movement of the electrode until an increase in welding current and/or voltage results in the reigniting of an electric-arc between the electrode and the workpiece. The wire electrode feeding mechanism may then be controlled by a second control signal that causes the electrode to be fed forwards toward the workpiece in the electric-arc phase. During this electric-arc phase the electrode will be heated by both resistance to current flowing through the electrode and by heat generated from the electric-arc between the distal end of the electrode and the workpiece. The heat generated in the electrode results in the formation of a droplet of molten metal at the distal end of the electrode. However, controlling the movement direction of the consumable wire electrode does not necessarily have to correlate with the occurrence of the electric-arc phase and/or the short-circuit phase. The electric-arc phase may be effected at any point in the movement of the electrode by control of the amount of electrical energy introduced into the electrode, e.g., during the backward movement of the wire electrode. In one exemplary implementation of the process in accordance with this disclosure, an electric-arc may have already been established following the short-circuit phase, and the wire electrode may be moved away from the workpiece until a defined point of time and/or distance has been reached.

Droplet detachment from the distal end of the electrode may be effected during the electric-arc phase by movement of the wire electrode forward until the droplet makes contact with a weld pool formed on a surface of the workpiece. The surface tension of the droplet of molten filler metal on the distal end of the wire electrode once the droplet has made contact with the weld pool assists in the detachment of the droplet from the electrode during backward movement of the electrode. An increase in the welding current after a short-circuit condition has been detected may also assist with droplet detachment if the increase is timed to help pinch off the droplet from the distal end of the electrode. Re-ignition of the electric-arc during the backward movement away from the workpiece after the short-circuit phase may occur with the welding current and/or voltage initially at a reduced, base level, followed by an increase in the welding current and/or voltage as the electrode is again moved forward toward the component.

In the exemplary low heat input weld hardfacing process illustrated in FIG. 5, a surface area of a metal component to be hardfaced may be cleaned at step 520. In addition, various techniques for removing all traces of any defects in the area to be hardfaced may include chipping, grinding, arc gouging, flame gouging, chemical treatment, shot peening or other processes. Dye penetrant inspection or magnetic particle inspection are two examples of techniques that may be used to ensure that all traces of the defect have been removed. Before beginning the hardfacing process, any surface oil or grease may be removed using solvents, steam cleaning, electro-chemical cleaning, abrasive blasting, or other known techniques.

The next step 522 may include providing a variable electric power to a consumable, low carbon steel wire electrode. In one exemplary implementation, the weld parameters may include supplying 8.5 volts±10% and 60 amps±10% to the wire electrode at a pulse frequency that is synchronized with a reciprocating motion of the wire electrode. At step 524 the wire electrode may be reciprocated toward and away from the metal component being hardfaced, while at the same time controlling the amount of welding current and/or voltage provided to the electrode. The exemplary process may include welding up a removed area of the component using a consumable, low carbon steel metal electrode having a Coefficient of Thermal Expansion (CTE) that is within ±10% of the CTE of the base material. Matching the CTE of the weld material with the CTE of the base material may ensure that the hardfaced area will expand and contract at approximately the same rate as the base material when the component is subjected to temperature cycles and fluctuations during use.

As shown at step 526 in FIG. 5, in addition to reciprocating the wire electrode toward and away from the component during the CMT hardfacing process, the reciprocating wire electrode may also be moved relative to the component in a weaving pattern over the surface area being hardfaced. A "weaving pattern" may encompass relative motion between the electrode and the component that results from moving one or both of the electrode and the component. In some exemplary implementations, the weaving pattern may include providing relative motion between the electrode and the component at a rate of approximately 1-2 cycles per second over successively formed, adjacent strips along the area to be hardfaced that may be approximately 5-15 mm in width, with each successive strip being formed in an opposite direction from the adjacent strip.

At step 528, at least one of the welding current and the welding voltage supplied to the wire electrode may be pulsed from a higher value during an electric arc phase as the electrode approaches the component, to a lower value during a short-circuit phase when a droplet of molten weld filler metal at the distal end of the electrode contacts a molten weld pool being formed on a surface of the component. This cycling of the current and/or voltage applied to the electrode results in a significantly lower total amount of heat input during welding as there is a short "cooling off" period after each detection of a short-circuit and detachment of a droplet of molten weld filler metal from the distal end of the electrode. In an exemplary implementation of this disclosure, the electrode may be reciprocated toward and away from the component at anywhere from approximately 50-150 cycles per second, or even more preferably, 70-80 cycles per second. The numerous, intermittent "cooling off" periods that result help to minimize total heat input, minimize the size of the HAZ, and reduce the amount of dilution of the base metal into the filler metal.

After completion of the hardfacing of a surface area on the component, the component may be cooled off and final machined. In some implementations, pre-heating of the component before weld hardfacing may help to slow down the cooling rate of the HAZ after welding, thereby preventing the formation of cracks in the hardfaced component. The weld buildup formed over the area to be hardfaced may experience very fast rates of solidification (quenching) as a result of the relatively low amounts of heat input during the process of depositing weld material from the low carbon steel wire electrode onto the component. The fast solidification may in turn result in austenite formed during each electric arc phase in the weld pools on the surface of the component undergoing a diffusionless, shear or displacement-type transformation from the austenite to a nearly 100% martensite crystal microstructure. The result is a very hard surface, with very little spatter, achieved using a low cost, low carbon steel wire electrode in a CMT process.

It will be apparent to those skilled in the art that various modifications and variations can be made to the disclosed method of hardfacing metal components. Other embodiments will be apparent to those skilled in the art from consideration of the specification and practice of the disclosed hardfacing methods. It is intended that the specification and examples be considered as exemplary only, with a true scope being indicated by the following claims and their equivalents.

What is claimed is:

1. A method of hardfacing a metal component, comprising:
   welding a surface area of the metal component using a Cold Metal Transfer (CMT) process;
   performing the welding in a weaving pattern over the surface area of the component; and
   using a consumable, low carbon steel wire electrode in the CMT process,
   wherein the CMT process is a Short-Circuit Gas Metal Arc Welding (GMAW-S) process,
   wherein the CMT process comprises pulsing at least one of a welding current and a welding voltage supplied to the consumable, low carbon steel wire electrode at the same time as reciprocating the wire electrode toward and away from the metal component, and
   wherein the method further comprises:
      moving the consumable, low carbon steel wire electrode toward the metal component while generating an electric arc during an electric arc phase between a distal end of the electrode and the metal component by increasing at least one of the welding current and the welding voltage;

forming a droplet of molten metal on the distal end of the electrode;

detecting a short-circuit during a short circuit phase when the droplet on the distal end of the electrode contacts a weld pool on the metal component;

lowering the welding current after detection of the short-circuit; and moving the consumable, low carbon steel wire electrode away from the metal component, thereby assisting separation of the droplet from the distal end of the electrode.

2. The method of claim 1, wherein the low carbon steel wire electrode comprises less than 0.20% by weight carbon.

3. The method of claim 1, wherein the CMT process comprises pulsing at least one of a welding current and a welding voltage supplied to the consumable, low carbon steel wire electrode.

4. The method of claim 1, wherein the CMT process comprises reciprocating the consumable, low carbon steel wire electrode toward and away from the metal component concurrently with moving the electrode in the weaving pattern over the surface area of the component.

5. The method of claim 1, wherein the consumable, low carbon steel wire electrode is reciprocated toward and away from the metal component at a cycle rate of between 50 and 150 cycles per second while at the same time moving at least one of the electrode and the metal component relative to the other in a back and forth weaving pattern at the rate of 1-2 times per second over a portion of the surface area that is 5-15 mm in width for each cycle.

6. The method of claim 1, wherein the welding current is increased immediately after detecting the short-circuit in order to assist with separation of the droplet of molten metal from the distal end of the electrode, and wherein a welding current of 60 amps±10% and a welding voltage of 8.5 volts±10% are generated during the electric arc phase.

7. A method of hardfacing a metal component, the method comprising:

welding a surface area of the metal component using a Cold Metal Transfer (CMT) process, the CMT process comprising:

providing electrical power from a power source to a consumable, low carbon steel wire electrode, wherein the consumable, low carbon steel wire electrode comprises 0.05-0.20% by weight carbon (C), 1.30-2.0% by weight manganese (Mn), and 0.70-1.20% by weight silicon (Si), the electrical power being provided in a succession of pulses of electrical power with at least one of varying current and varying voltage;

reciprocating the consumable, low carbon steel wire electrode toward and away from the metal component;

controlling the electrical power being provided to the electrode while the electrode is being reciprocated such that at least one of a welding current and a welding voltage supplied to the electrode is pulsed from a higher value during an electric-arc phase to a lower value during a short-circuit phase;

sensing a short-circuit condition when a molten droplet of weld filler metal on a distal end of the electrode makes contact with a molten weld pool being formed on a surface of the metal component;

moving the electrode away from the metal component and reducing the electrical power provided to the electrode each time the short-circuit condition is sensed; and repeating the reciprocating of the electrode and the pulsing of electrical power provided to the electrode in order to deposit a succession of small droplets of molten weld filler metal from the electrode onto the surface of the metal component.

8. The method of claim 7, further including removing material from the surface area of the metal component before welding, and pre-heating the metal component before commencing the CMT process to a temperature in a range from 200-800 degrees F.

9. The method of claim 7, further including pre-heating the metal component before commencing the CMT process to a temperature in a range from 300-400 degrees F.

10. The method of claim 7, wherein the consumable, low carbon steel wire electrode is reciprocated toward and away from the metal component at a cycle rate of between 50 and 150 cycles per second.

11. The method of claim 7, further including:

moving the consumable, low carbon steel wire electrode toward the metal component while generating an electric-arc between the distal end of the electrode and the metal component by increasing at least one of the welding current and the welding voltage;

forming the droplet of molten weld filler metal on the distal end of the electrode;

detecting the short-circuit when the droplet on the distal end of the electrode contacts the molten weld pool on the metal component;

increasing the welding current in order to induce the droplet of molten weld filler metal to pinch off from the distal end of the electrode;

lowering at least one of the welding current and the welding voltage after the short-circuit condition is no longer detected; and moving the consumable wire electrode away from the metal component by a predetermined distance, thereby further assisting separation of the droplet of molten weld filler metal from the distal end of the electrode.

12. The method of claim 7, further including increasing at least one of the welding current and the welding voltage after the short-circuit condition is no longer detected and the electric-arc phase has been reestablished by ignition of an electric-arc between the distal end of the electrode and the metal component.

* * * * *